United States Patent
Marks et al.

(10) Patent No.: US 10,495,152 B2
(45) Date of Patent: Dec. 3, 2019

(54) COUPLING ASSEMBLY

(71) Applicants: Ryan Kenneth Marks, Franksville, WI (US); David William Olson, Menomonee Falls, WI (US)

(72) Inventors: Ryan Kenneth Marks, Franksville, WI (US); David William Olson, Menomonee Falls, WI (US)

(73) Assignee: Phoenix Sokoh Couplings, LLC, Menomenee Falls, WI (US)

( * ) Notice: Subject to any disclaimer, the term of this patent is extended or adjusted under 35 U.S.C. 154(b) by 76 days.

(21) Appl. No.: 15/221,135

(22) Filed: Jul. 27, 2016

(65) Prior Publication Data

US 2017/0067585 A1    Mar. 9, 2017

Related U.S. Application Data

(63) Continuation-in-part of application No. 14/846,363, filed on Sep. 4, 2015, now Pat. No. 9,771,983.

(51) Int. Cl.
*F16D 3/78* (2006.01)
*F16D 1/00* (2006.01)

(52) U.S. Cl.
CPC ...... *F16D 1/00* (2013.01); *F16D 3/78* (2013.01)

(58) Field of Classification Search
CPC ................................. F16D 3/78; F16D 1/00
USPC ........................................ 464/93–96, 98, 99
See application file for complete search history.

(56) References Cited

U.S. PATENT DOCUMENTS

| | | | |
|---|---|---|---|
| 1,350,500 A * | 8/1920 | Hardy | F16D 3/78 |
| | | | 464/93 |
| 2,182,711 A | 12/1939 | Thomas | |
| 2,712,741 A | 7/1955 | Roller | |
| 2,846,857 A | 8/1958 | Hagenlocher | |
| 3,405,760 A | 10/1968 | Smith | |
| 3,422,637 A * | 1/1969 | Kelley | F16D 3/78 |
| | | | 464/93 |
| 3,500,658 A | 3/1970 | Goody | |
| 3,654,775 A | 4/1972 | Williams | |
| 3,703,817 A | 11/1972 | Orwin | |
| 3,768,276 A | 10/1973 | Caldwell et al. | |

(Continued)

FOREIGN PATENT DOCUMENTS

DE        39 42 797 A1 *    7/1991  ...................... 464/93

OTHER PUBLICATIONS

American Roller Company, Industrial Coatings, Internet Website, last accessed Mar. 9, 2016, 8 pages http://www.plasmacoatings.com/surfacetractioncoatings.html.

(Continued)

*Primary Examiner* — Greg Binda
(74) *Attorney, Agent, or Firm* — Reinhart Boerner Van Deuren P.C.

(57) ABSTRACT

A coupling assembly includes a body member and at least one end member attached to the body member. At least one connection arrangement is situated between the body member and the at least one end member, respectively. The at least one connection arrangement includes a plurality of bushings. A plurality of fasteners are each respectively received by the plurality of bushings to fasten the body member to the at least one end member. Each one of the plurality of bushings are rotationally fixed about their center longitudinal axes by the at least one connection arrangement.

25 Claims, 12 Drawing Sheets

(56) References Cited

U.S. PATENT DOCUMENTS

| | | | |
|---|---|---|---|
| 4,055,966 A | | 11/1977 | Fredericks |
| 4,073,161 A | | 2/1978 | Bury |
| 4,096,711 A | | 6/1978 | Carlson et al. |
| 4,191,030 A | | 3/1980 | Calistrat |
| 4,245,709 A | * | 1/1981 | Manuel ...................... 175/325.5 |
| 4,353,704 A | | 10/1982 | Corey |
| 7,559,845 B2 | | 7/2009 | Corey |
| 8,002,639 B2 | * | 8/2011 | Mayr ........................ F16D 3/79 |
| | | | 464/98 |
| 2014/0186583 A1 | | 7/2014 | Speth |

OTHER PUBLICATIONS

Impreglon Surface Technology Group, Traction Coating, Internet Website, last accessed Mar. 9, 2016, 4 pages http://www.impreglon.us/front_content.php?idcat=90.

Marcote, Traction Coating, Internet Website, last accessed Mar. 9, 2016, 1 page http://marcote.co.uk/traction-coating/.

* cited by examiner

COUPLING ASSEMBLY

CROSS REFERENCE TO RELATED APPLICATIONS

This application is a continuation-in-part of U.S. patent application Ser. No. 14/846,363, filed on Sep. 4, 2015, now U.S. Pat. No. 9,771,983, the entire teachings and disclosure of which are incorporated herein by reference thereto.

FIELD OF THE INVENTION

This invention generally relates to couplings, and more particularly to mechanical couplings utilized to transfer a rotational torque

BACKGROUND OF THE INVENTION

For power transmission in the form of a torque from a motor, engine, turbine, or other power source to another device, such as a gear box, pump, generator, compressor or other device receiving the power, a coupling may be utilized. Such a coupling may be a single unitary component, such as a simple shaft, or an assembly of multiple components which are aligned along a common longitudinal axis. In either case, an input torque from the power source is transferred via the coupling to the gear box or other device.

In the context of a coupling assembly, each component thereof is typically a shaft element having a flange at one or both ends thereof for connection to other similarly shaped components of the assembly. The flange of each component typically has a hole pattern for receipt of a plurality of fasteners, which are typically bolts or the like. For each bolt, an associated nut is typically utilized as well. As a result, the flanges of adjacent components of the coupling assembly are interposed between a number of bolt heads and an associated nuts when fully assembled.

Unfortunately, the use of the nut for each fastener requires a relatively large amount of clearance to utilize a wrench or other device to hold the nut in place as the bolt is tightened. This large amount of clearance means that the overall outer diameter of the component which the nut seats against must be reduced to allow for said clearance. This reduction in diameter directly correlates to the maximum shaft size which a coupling can accommodate, which also directly impacts the torque density of the coupling assembly. Torque density is defined as the maximum torque capacity of the coupling assembly divided by the outermost diameter of the coupling assembly. As such, there is a need in the art for a coupling assembly with an improved connection arrangement utilized between adjacent components thereof to allow for a larger diameter of the components of the coupling assembly, which would lead to a larger bore diameter to coupling diameter ratio, as well as a greater torque density.

The invention provides such a coupling assembly. These and other advantages of the invention, as well as additional inventive features, will be apparent from the description of the invention provided herein.

BRIEF SUMMARY OF THE INVENTION

In one aspect, embodiments of the invention provide a coupling assembly that allows for an increase in the outer diameter thereof so as to provide a greater torque rating for the coupling assembly. An embodiment of such a coupling assembly includes a body member and at least one end member attached to the body member. At least one connection arrangement is situated between the body member and the at least one end member, respectively. The at least one connection arrangement comprises a plurality of bushings. A plurality of fasteners are respectively received by the plurality of bushings to fasten the body member to the at least one end member. Each one of the plurality of bushings are rotationally fixed about their center longitudinal axes by the at least one connection arrangement.

In certain embodiments, the at least one end member includes a first and a second end member. The at least one connection arrangement includes a first connection arrangement and a second connection arrangement. The first connection arrangement is interposed between the first end member and a first end of the body member. The second connection arrangement is interposed between the second end member and a second end of the body member.

Each of the first and second connection arrangements include a disc pack interposed between a pair of pilot rings. The disc pack includes a plurality of identical stacked flexible discs. Each one of the plurality of identical stacked flexible discs includes a hole pattern therein.

Each one of the pair of pilot rings includes a plurality of circular apertures and a plurality of non-circular apertures formed therein. The plurality of non-circular apertures of the pair of pilot rings respectively receives body portions of the plurality of bushings. The body portion of each of the plurality of bushings has a non-circular outer periphery. The body portion of each of the plurality of bushings is respectively received in the plurality of non-circular apertures to rotationally fix each bushing about its center longitudinal axis.

In certain embodiments, the body member includes a radially protruding flange and the at least one end member includes a radially protruding flange. The plurality of fasteners includes a first set and a second set. The first set and second set are opposed such that the first set seats against the body member flange and the second set seats against the at least one end member flange. A terminal end of each of the plurality of fasteners is disposed, respectively, within an interior passageway of each of the plurality of bushings.

In certain embodiments, the coupling assembly can also include an anti-slip arrangement interposed between the body member and the at least one end member. The anti-slip arrangement comprises a coating on axially outer facing surfaces of the at least one connection arrangement such that coated surfaces of the at least one connection arrangement, an axially facing surface of the body member, and an axially facing surface of the at least one end member are in contact with one another. The coated surfaces may comprise tungsten carbide coating.

In certain embodiments, each one of the plurality of bushings includes a flange portion, and a body portion. The flange portion protrudes radially outward relative to the body portion. As one example, the flange portion has an axial thickness of about 0.070 inches to about 0.090 inches.

In another aspect, embodiments of the invention provide a coupling assembly which allows for axial misalignment of its respective members to compensate for minor deviations in alignment between componentry connected by the coupling assembly. An embodiment of such a coupling assembly includes a body member. The body member includes a radially protruding flange. The coupling assembly also includes at least one end member attached to the body member. The at least one end member includes a radially protruding flange. A connection arrangement is situated between the body member and the at least one end member. A plurality of fasteners are respectively received by the connection arrangement to fasten the body member to the at least one end member. The plurality of fasteners includes a first set and a second set. The first set and the second set are opposed such that the first set seats against the body member flange and the second set seats against the at least one end member flange. The coupling assembly also includes an anti-slip arrangement formed between the at least one end member and the body member, the anti-slip arrangement configured to reduce a rotation of the at least one end member relative to the body member about a longitudinal axis of the coupling assembly.

In certain embodiments, the at least one end member includes a first and a second end member. The at least one connection arrangement includes a first connection arrangement and a second connection arrangement. The first connection arrangement is interposed between the first end member and a first end of the body member. The second connection arrangement is interposed between the second end member and a second end of the body member.

Each of the first and second connection arrangements includes a disc pack interposed between a pair of pilot rings. The disc pack includes a plurality of identical stacked flexible discs. Each one of the plurality of identical stacked flexible discs includes a hole pattern therein. Each one of the pair of pilot rings includes a plurality of circular apertures and a plurality of non-circular apertures formed therein.

The plurality of non-circular apertures of the pair of pilot rings respectively receives body portions of a plurality of bushings of the connection arrangement. The body portion of each of the plurality of bushings has a non-circular outer periphery. The body portion of each of the plurality of bushings is respectively received in the plurality of non-circular apertures to rotationally fix each bushing about its center longitudinal axis. A terminal end of each of the plurality of fasteners is disposed, respectively, within an interior passageway of each of the plurality of bushings.

In certain embodiments, the anti-slip arrangement comprises a coating on axially outer facing surfaces of the at least one connection arrangement such that coated surfaces of the at least one connection arrangement, an axially facing surface of the at least one end member, and an axially facing surface of the body member are in contact with one another. The coated surfaces may comprise tungsten carbide coating.

In certain embodiments, each one of the plurality of bushings includes a flange portion, and a body portion, the flange portion protruding radially outward relative to the body portion. As one example, the flange portion has an axial thickness of about 0.070 inches to about 0.090 inches.

In yet another aspect, a method of assembling a coupling assembly is provided which presents a reduced tooling and labor effort. An embodiment of such a method includes providing a body member with a first end and a second end. The method also includes connecting a first end member to the first end. This step of connecting includes interposing a first connection arrangement and an anti-slip arrangement between the first member and the first end of the body member. The first end member, first end of the body member, and the first connection arrangement define a first plurality of aligned passageways. This step of connecting also includes respectively positioning each one of a first plurality of fasteners within each one of the plurality of aligned passageways such that a terminal end of each one of the plurality of fasteners is disposed within its associated aligned passageway.

The method also includes connecting a second end member to the second end. This step of connecting includes interposing a second connection arrangement and another anti-slip arrangement between the second end member and the second end of the body member. The second end member, second end of the body member, and the second connection arrangement define a second plurality of aligned passageways. This step of connecting also includes respectively positioning each one of a second plurality of fasteners within each one of the second plurality of aligned passageways such that a terminal end of each one of the second plurality of fasteners is disposed within its associated aligned passageway.

In certain embodiments, the step of connecting the first end member to the first end includes installing the first plurality of fasteners such that a first set of the first plurality of fasteners faces in an opposite direction as that of a second set of the first plurality of fasteners. The step of connecting the second end member to the second end includes installing the second plurality of fasteners such that a first set of the second plurality of fasteners faces in an opposite direction as that of a second set of the second plurality of fasteners.

In certain embodiments, the step of connecting the first end member to the first end includes installing the first plurality of fasteners within a first plurality of bushings which are rotationally fixed about their center longitudinal axes. The step of connecting the second end member to the second end includes installing the second plurality of fasteners within a second plurality of bushings which are rotationally fixed about their center longitudinal axes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the accompanying drawings, FIGS. 1-5 illustrate an exemplary embodiment of a coupling assembly according to the teachings of the present invention. As will be understood from the following, the coupling assembly herein presents an improvement in the state of the art of coupling assemblies by allowing for a larger diameter of the components of the coupling assembly. As will be understood from the following, this larger diameter capability is achieved by utilizing fasteners which do not require a separate nut for fastening the same. Instead, a new and improved anti-rotational bushing system is utilized which allows for the omission of a nut that would otherwise be associated with each fastener.

Figure 1:
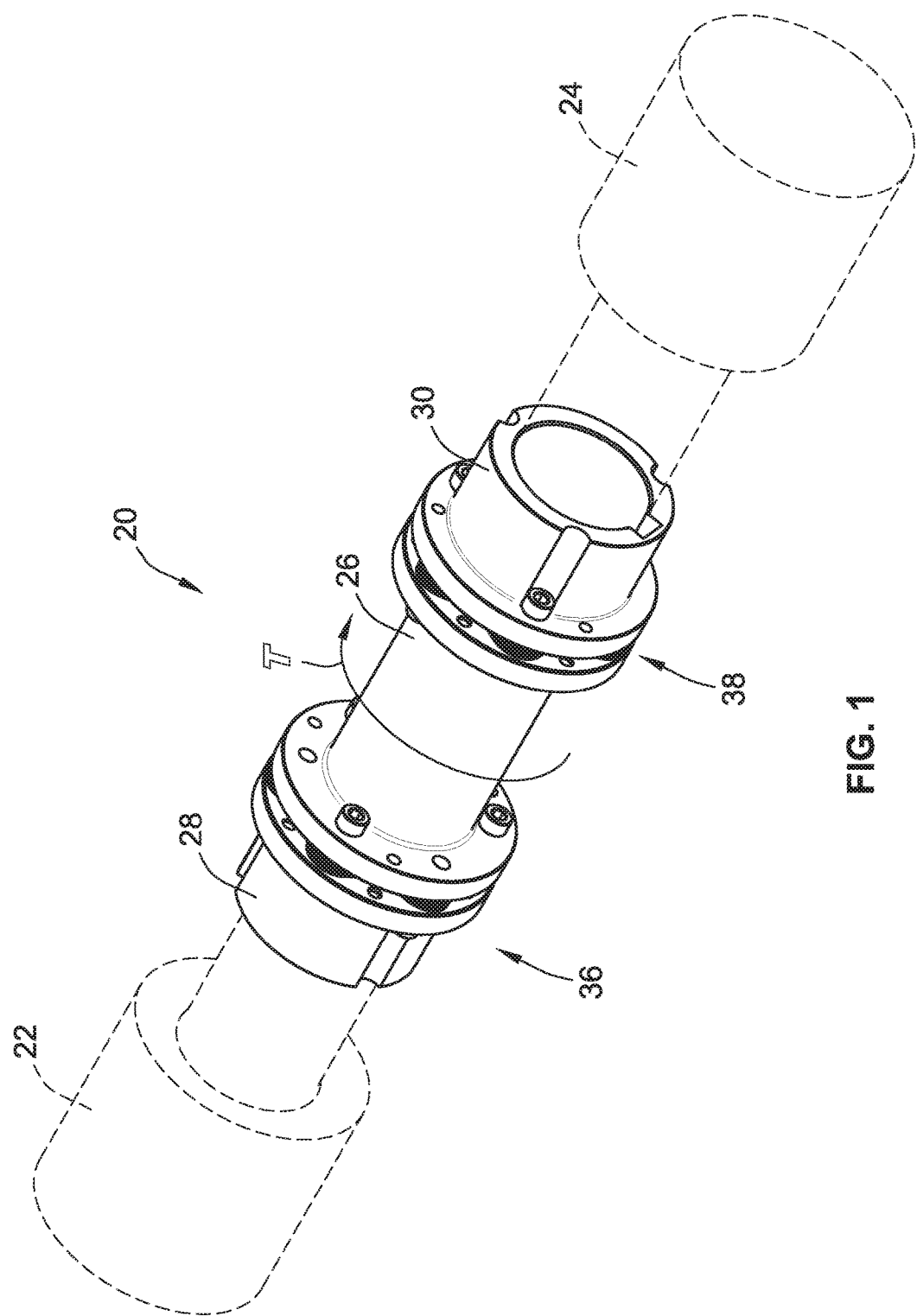
FIG. 1 is a perspective view of one embodiment of a coupling assembly according to the teachings of the present invention.

With particular reference to FIG. 1, an exemplary embodiment of a coupling assembly 20 is illustrated. Coupling assembly 20 is shown connected between a motor 22 and a gear box 24. Coupling assembly 20 transfers a rotational torque T from motor 22 to gear box 24. The assembled components of coupling assembly 20 each have a bore therethrough to define a continuous bore when assembled. A rotational element such as a shaft from each of motor 22 and gear box 24 are received within this bore. Accordingly, coupling assembly 20 includes appropriate keyways or the like for acceptance of these shafts and torque transmission. As will be readily recognized by those of skill in the art, coupling assembly 20 is not limited to any particular motor, gear box, or other componentry. As such, motor 22 and gear box 24 are shown schematically in FIG. 1. Further, while a motor 22 and gear box 24 are provided as the exemplary components between which coupling assembly 20 is situated, it will be readily recognized that coupling assembly 20 may be utilized in any application where a rotational torque is transferred from one element to another.

Coupling assembly 20 is illustrated as including a body member 26 with two end members 28, 30 attached to opposing ends of body member 26. As will be understood in greater detail from the following, although two end members 28, 30, are shown, body member 26 may connect to a single end member in other embodiments. An advantage of utilizing two end members 28, 30 and body member 26 and their associated connection arrangements 36, 38 is that such a configuration allows for a greater amount of axial, angular, and parallelism misalignment of motor 22 and gear box 24.

Each of body member 26 and end members 28, 30 are generally cylindrical in shape and each include a radially protruding flange. As can be seen from FIG. 1, in the case of body member 26, this component includes two radially protruding flanges at the opposing ends thereof. The flanges of these respective components align with one another to connect the same as shown in FIG. 1. More particularly, a first connection arrangement 36 is positioned between one of the flanges of body member 26 and end member 28. A second connection arrangement 38 is positioned between the other one of the flanges of body member 26 and end member 30. These connection arrangements 36, 38 allow for the aforementioned axial, angular, and parallelism misalignment of motor 22 and gear box 24 and also allow for the omission of the otherwise required nut associated with each fastener used to fasten the aforementioned components together.

Figure 2:
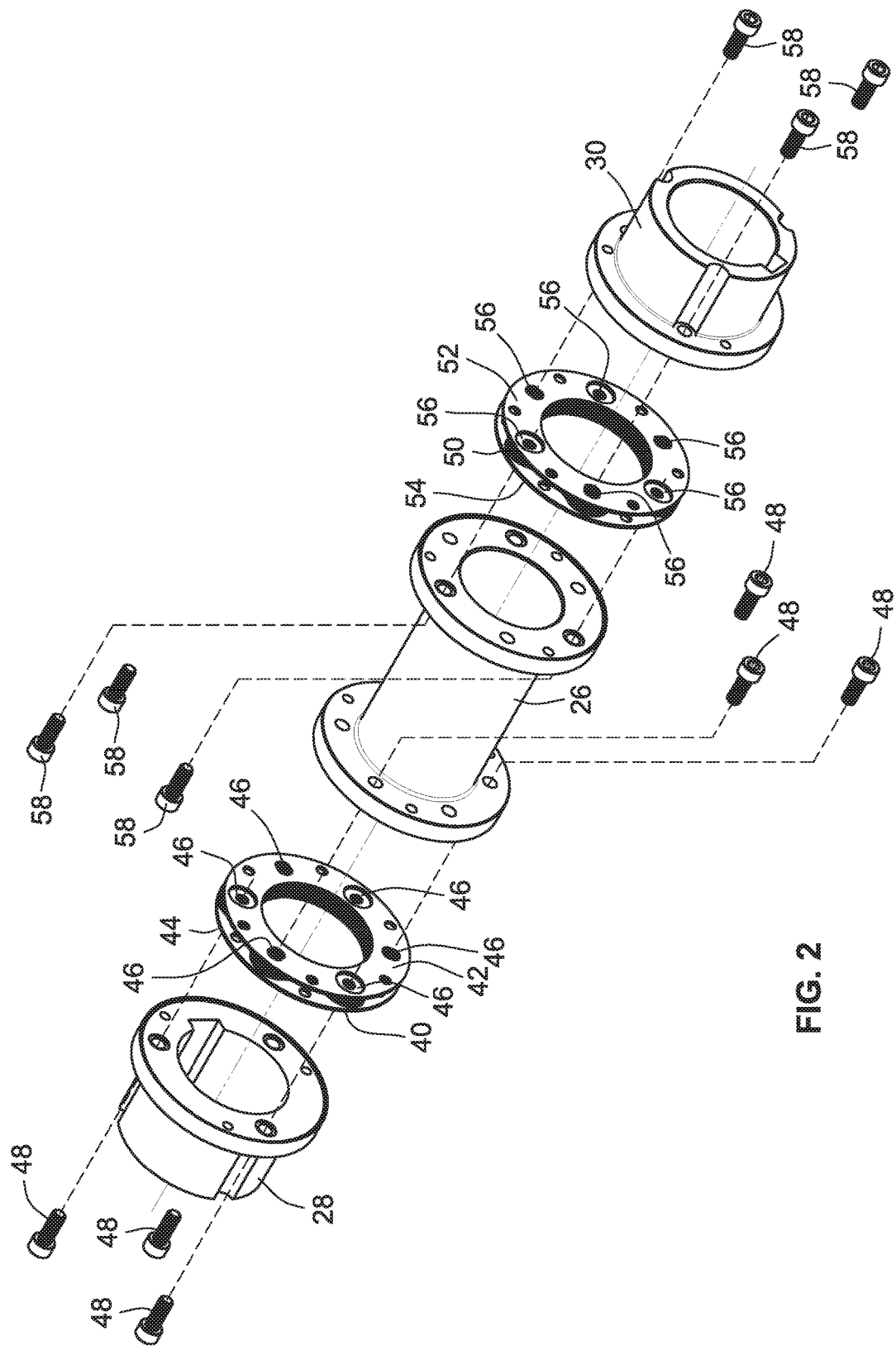
FIG. 2 is a perspective exploded view of the coupling assembly of FIG. 1.

Turning now to FIG. 2, coupling assembly 20 is shown in an exploded view. Connection arrangement 36 includes a disc pack 40 which is interposed between a pair of pilot rings 42, 44. Disc pack 40 includes a plurality of stacked thin plate-like elements. Pilot rings 42, 44 are also thin plate-like elements. A number of bushings 46 are received by disc pack 40 and pilot rings 42, 44. As will be explained in greater detail below, these bushings 46 are keyed to pilot rings 42, 44 such that they cannot rotate about their center longitudinal axes. This advantageously allows fasteners 48 to be threadably installed into bushings 46 without the bushings 46 rotating as the fastener is rotated to tighten the same.

In an identical fashion, connection arrangement 38 also includes a disc pack 50 interposed between a pair of pilot rings 52, 54. A number of bushings 56 are received in disc pack 50 and pilot rings 52, 54. These bushings 56 are keyed to pilot rings 52, 54 such that they cannot rotate as fasteners 58 are threadably installed into bushings 56.

As can also be seen in FIG. 2, connection arrangement 36 and the adjacent flanges of body member 26 define aligned passageways therethrough for the insertion of a first set of fasteners 48. Connection arrangement 36 and the flange of end member 28 also define aligned passageways therethrough for the insertion of a second set of fasteners 48. In an identical fashion, connection arrangement 38 and the adjacent flanges of body member 26 and end member 30 collectively defined aligned passageways for receiving fasteners 58. As can also be seen in FIG. 2 relative to connection arrangement 36, the first set of fasteners 48 faces in an opposite direction of the second set of fasteners 48. In other words, the first set of fasteners 48 passes through the flange of end member 28, and into connection arrangement 36. The second set of fasteners 48 passes through the flange of body member 26 adjacent connection arrangement 36 and terminates in connection arrangement 36.

Likewise, and relative to connection arrangement 38, the first set of fasteners 58 passes through end member 30 and terminates in connection arrangement 38. The second set of fasteners 58 passes through the flange of body member 26 adjacent connection arrangement 38 and terminates in connection arrangement 38.

Figure 3:
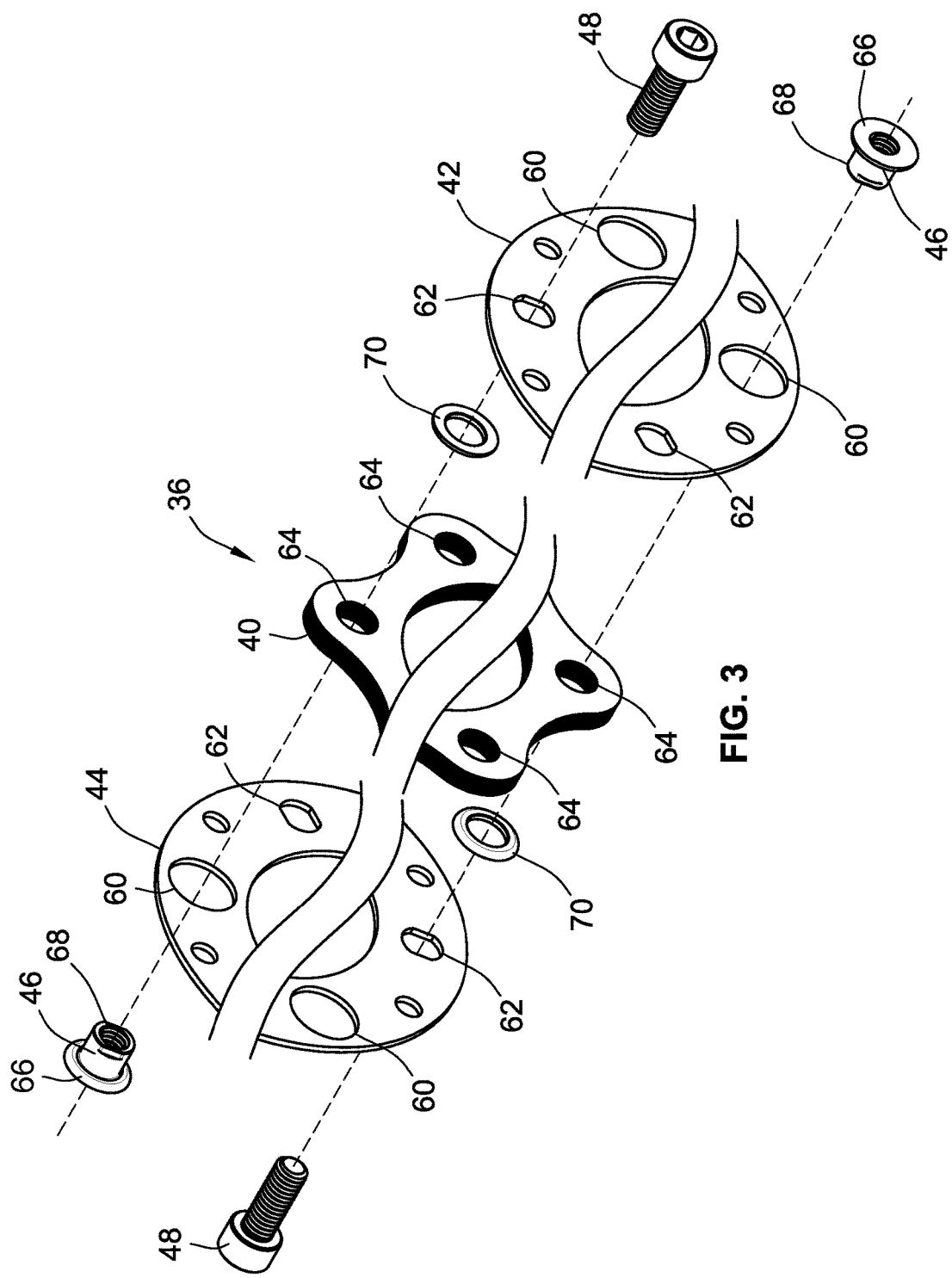
FIG. 3 is a perspective exploded view of a connection arrangement of the coupling assembly of FIG. 1.

Turning now to FIG. 3, a more detailed explanation of the aforementioned aligned passageways and interaction between the aforementioned fasteners and connection arrangement will be provided. More particularly, connection arrangement 36 is shown in an exploded view in FIG. 3 in association with fasteners 48. It will be recognized that the following description applies equally well to connection arrangement 38 given the identical design of these components.

Each pilot ring 42, 44 includes a plurality of circular apertures 60 and a plurality of non-circular apertures 62. Disc pack 40, and more particularly each of its associated rings, includes a plurality of apertures 64 which are aligned with apertures 60, 62 of pilot rings 42, 44. Each of the above-introduced bushings 46 includes a head portion 66 having a flange (the head portion also referred to herein as a flange portion), and a body portion 68 which has a non-circular outer periphery.

Body portion 68 of each bushing 46 passes through its associated aperture 64 until it is received by an associated non-circular aperture 62. This non-circular shape of non-circular aperture 62 and the outer periphery of body portion 68 prevents bushing 46 from rotating about its center longitudinal axis. Such a configuration prevents each bushing 46 from rotating its associated fastener 48 is threadably installed therein. As can also be seen in FIG. 3, an associated washer 70 may also be utilized between disc pack 40 and each pilot ring 42, 44 as needed.

Those of skill in the art will readily recognize that this alleviates the need to utilize a nut on the end of each fastener 48 and allows the terminal end of each fastener 48 to terminate within an interior of the aligned passageway receiving the same. In other words, the terminal end of the fastener does not protrude axially beyond the flange immediately adjacent the head portion 66 of the bushing 46 receiving that fastener.

Because there is no nut on the backside of the flange, a tool such as a wrench or socket is not required to hold such a nut in place. As a result, the above-discussed undesirable clearance required for such tools is eliminated. Therefore, the overall outer diameter of coupling assembly 20 and its associated componentry is increased. This also allows for coupling assembly 20 to have a greater bore diameter and higher torque density than prior designs. The higher bore diameter means that the coupling assembly can accept larger diameter shafts from motor 22 and gear box 24 (see FIG. 1) than prior designs. Additionally, in prior coupling designs fasteners such as bolts having highly precise dimensional tolerances are required to maintain concentricity of the assembly. On the contrary, and due to the highly precise tolerances of the bushings 46, 56 and their corresponding non-circular apertures 62, the concentricity of coupling assembly 20 is maintained in large part due to these highly precise tolerances and therefore standard fasteners such as bolts may be utilized which do not have such highly precise tolerances as those fasteners of prior designs.

Figure 4:
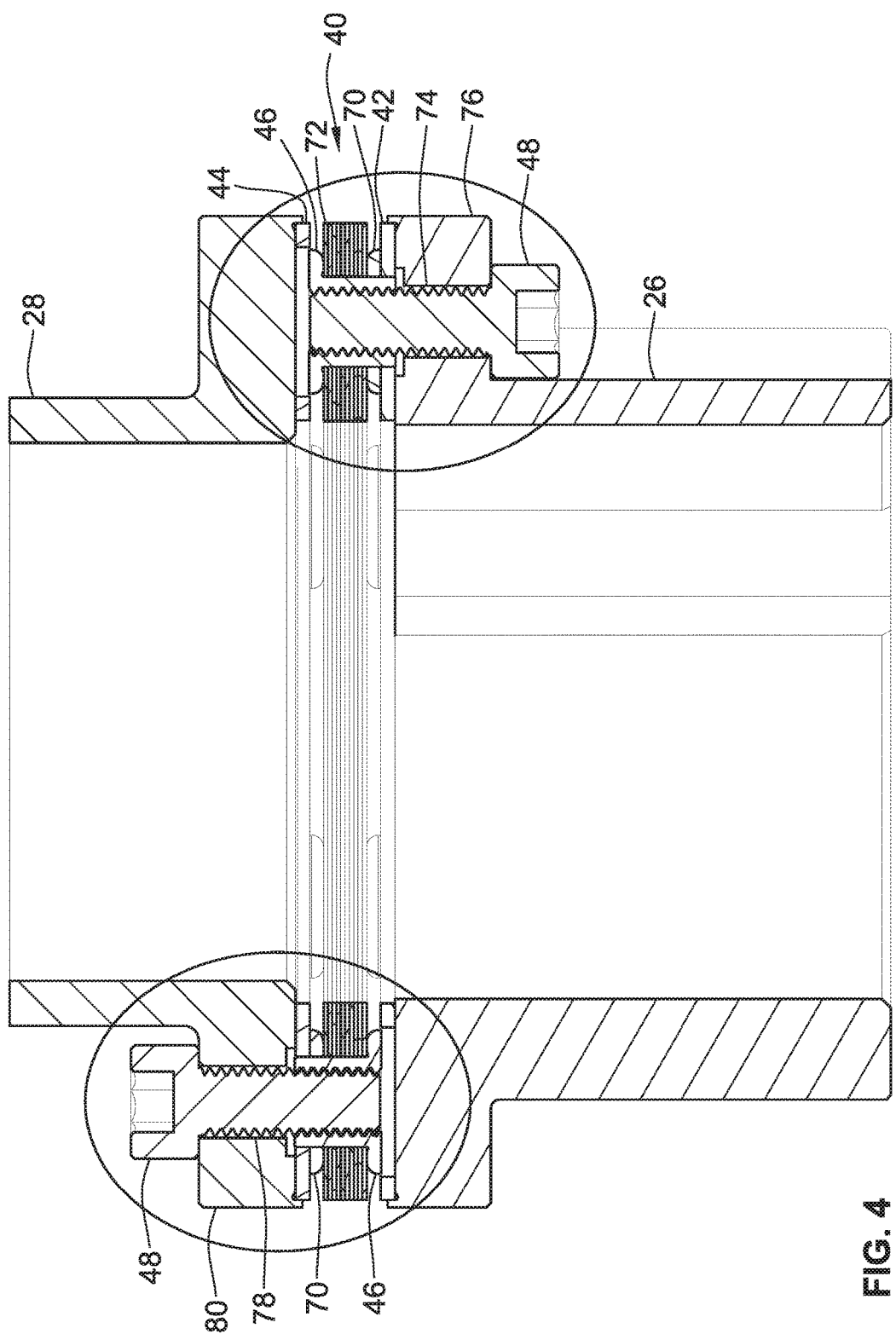
FIG. 4 is a cross section of the coupling assembly of FIG. 1.

Turning now to FIG. 4, the same illustrates a cross-section of end member 28 installed relative to body member 26 using connection arrangement 36. As can be seen in this view, fasteners 48 face in opposing directions as introduced above.

Further, each fastener 48 is received within its associated bushing 46. As can also be seen, each fastener does not protrude axially beyond the bushing 46. Rather, the terminal end of each fastener 48 terminates within the aligned passageway defined by the flange and connection arrangement shown. Due to the aforementioned opposed arrangement of fasteners 48, coupling assembly 20 allows for axial, angular, and parallelism misalignment of the center longitudinal axes of body member 26 and end members 28, 30.

Indeed, because no single fastener 48 extends through both flanges and connection arrangement 36, and because they are arranged in an opposed spaced relationship, there is a degree of shifting of the center longitudinal axis of end member 28 relative to the center longitudinal axis of body member 26. Put differently, where there is no misalignment between motor 22 and gear box 24 (See FIG. 1) the center longitudinal axes of end member 28, body member 26 and end member 30 will be coaxial with one another. However, if there is some misalignment, either one of end members 28, 30 may shift in the radial direction relative to body member 26 due to the disc pack of each connection arrangement and the aforementioned arrangement of the fasteners and bushings.

Figure 5:
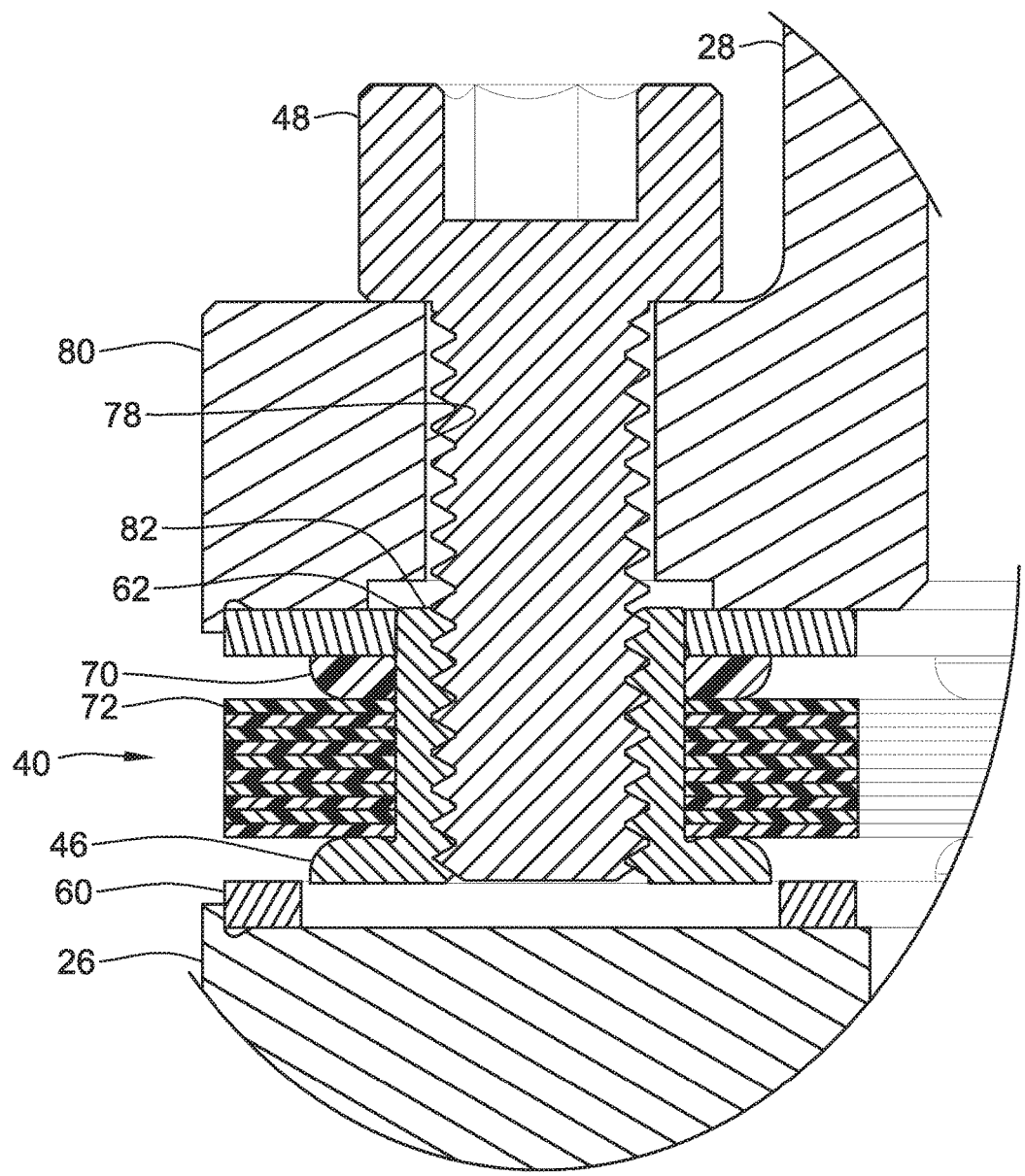
FIG. 5 is a partial view of the cross section of FIG. 4.

Turning now to FIG. 5, the same illustrates the cross-section of FIG. 4 in greater detail. As can be seen therein, disc pack 40 includes a plurality of stacked plate-like ring elements 72. Fastener 48 passes through receiving feature in the form of an aperture 78, particularly a counter bore as illustrated, in flange 80 of end member 28. This fastener is then received in a threaded aperture 82 of bushing 46. Continued tightening of fastener 48 pulls bushing 46 axially towards disc pack 40 and washer 70 to place a compressive force against the same and fixes disc pack 40 to flange 80. As may be seen in FIG. 5, there exists an axial clearance between an axially facing end of body portion 68 (see FIG. 3) of each bushing 46 and the counterbore that the end of body portion 68 moves into as fastener 48 is tightened. Because of the opposed figuration shown in FIG. 4, the same holds true for flange 76 of body member 26 and disc pack 40. Disc pack 40 is thus a common point of connection between end member 28 and body member 26. The same holds true for end member 30, body member 26, and connection arrangement 38.

As described herein, the embodiment of coupling assembly 20 presents and advantage over existing coupling designs by providing a configuration that does not require a nut associated with each fastener used to assemble the constituent components of the coupling assembly 20. Rather, a unique anti-rotational bushing arrangement is utilized which allows the fasteners of the coupling assemble to terminate within passageways of the coupling assembly as opposed to protruding therefrom and requiring a nut to tighten the same. This advantageously increases the overall shaft diameter the coupling can accommodate and increases its torque density. Such a configuration also allows for a reduction in cost and labor to assemble the coupling assembly 20.

With reference now to FIGS. 6-11, another embodiment of a coupling assembly 120 is illustrated. This embodiment is substantially similar to coupling assembly 20 described above. However, in this embodiment, bushings are utilized which are dimensionally different from bushings 46, 56 described above. Further, in this embodiment, an anti-slip arrangement is employed between the body member 126 and end members 128, 130 of coupling assembly 120 as detailed below.

Figure 6:
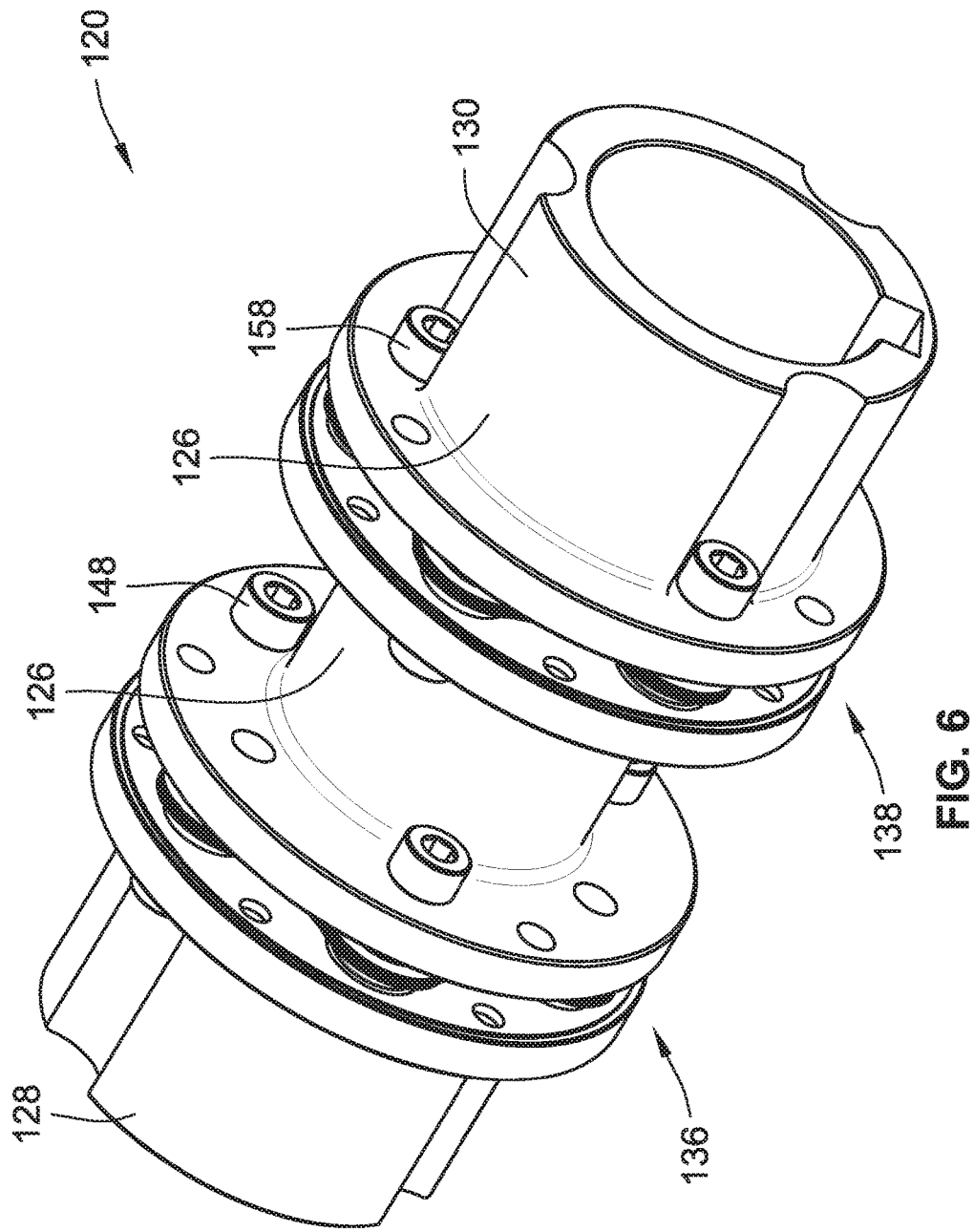
FIG. 6 is a perspective view of another embodiment of a coupling assembly according to the teachings of the present invention.

With particular reference to FIG. 6, this embodiment of coupling assembly 120 includes a body member 126 and end members 128, 130 disposed at the ends of body member 126. Body member 126 and end members 128, 130 are effectively identical to body member 26 and end members 28, 30, except for those distinctions identified below.

A connection arrangement 136 connects end member 128 to body member 126, and another connection arrangement 138 connects end member 130 to body member 26 in the same manner as that described above relative to connection arrangements 36, 38. As was the case with connection arrangements 36, 38 described above, connection arrangements 136, 138 are identical to one another. As such, a description of the components and configuration of one connection arrangement 136, 138 applies equally to the other. As will be understood from the following, connection arrangements 136, 138 are effectively identical to connection arrangements 36, 38 described above, except that they employ bushings which are dimensionally different from bushings 46, 56 described above, and each incorporate part of an anti-slip arrangement as described in greater detail below.

Figure 7:
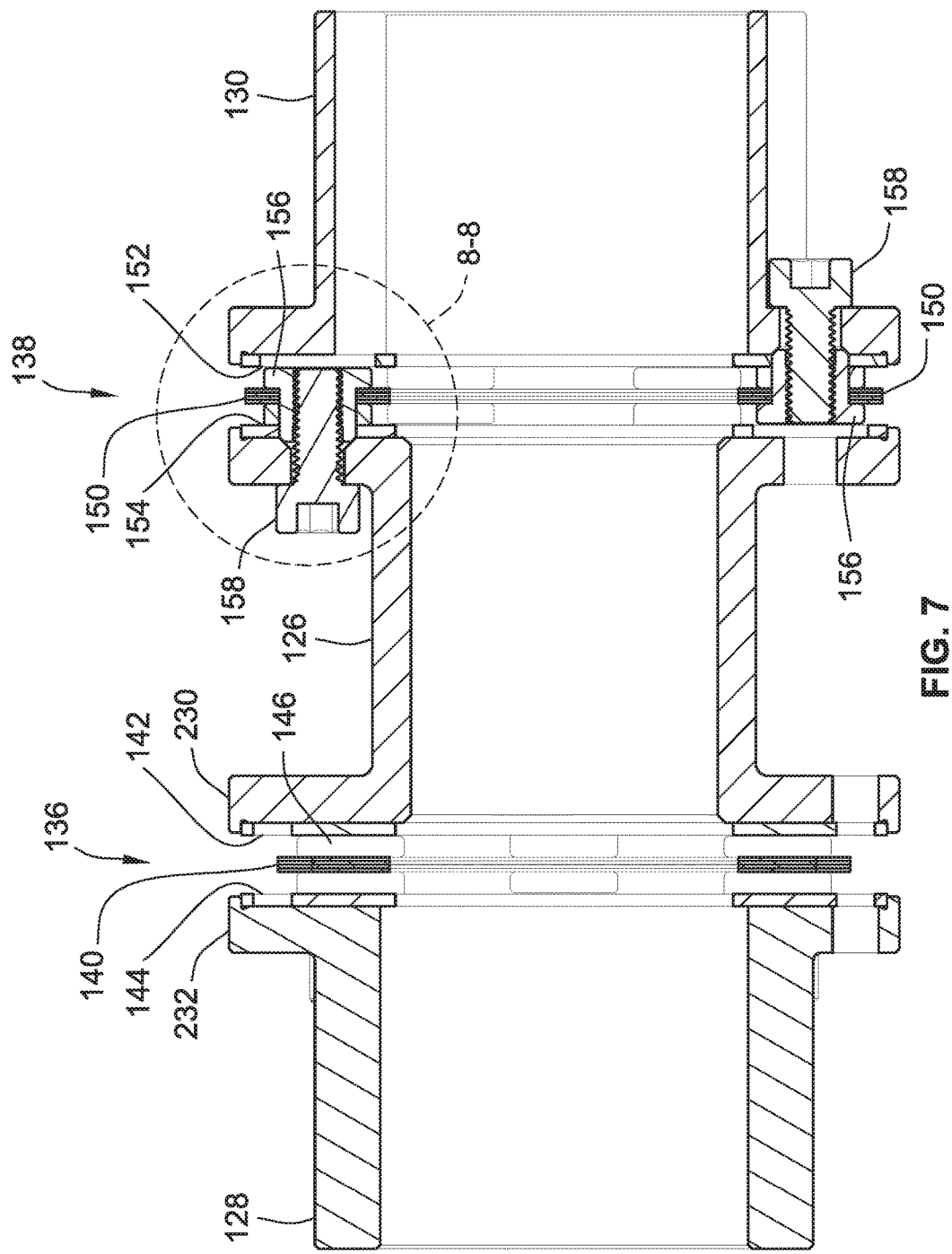
FIG. 7 is a cross section of the coupling assembly of FIG. 6.

Turning now to FIG. 7, coupling assembly 120 is shown in cross section. Connection arrangement 136 includes a disc pack 140 interposed between pilot rings 142, 144. Connection arrangement 136 also includes a plurality of bushings 146. In the same manner as the first embodiment, a plurality of fasteners 148 (see FIG. 6) thread into these bushings 146 and the heads of the fasteners seat against the flange 232 of end member 128. Similarly, a plurality fasteners 148 thread into bushings 146 and the heads of the fasteners seat against the flange 230 of body member 126. An identical configuration is shown in FIG. 2 above. Connection arrangement 138 also includes a disc pack 150, pilot plates 152, 154, bushings 156, and fasteners 158. These components are identical to, and arranged in an identical fashion to, those of connection arrangement 136.

Figure 8:
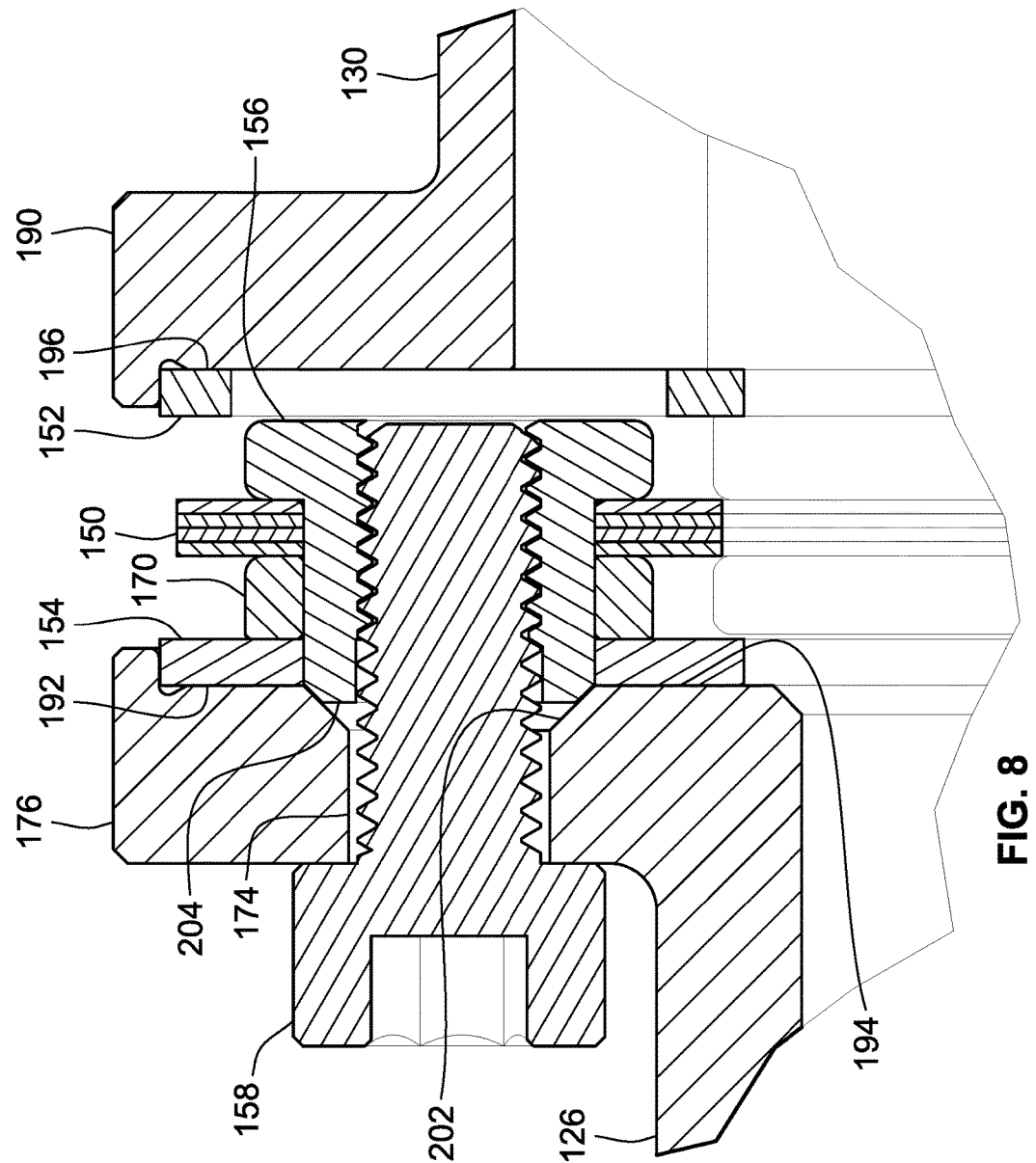
FIG. 8 is a partial cross section of the coupling assembly of FIG. 6.

Turning now to FIG. 8, the same illustrates a partial cross section of coupling assembly 120 in the area of one of fasteners 158. As can be seen in this view, fastener 158 passes through a bore 174 formed in flange 176 of body member 126 and threads into bushing 156. This threading biases bushing 156 from right to left in FIG. 8 such that flange of bushing 156 described below biases disc pack 150 towards body member 126. As can also be seen in this view, a washer 170 may be utilized between ring pack 150 and pilot ring 154. Further, flange 176 includes a flange surface 194 with receiving features in the form of countersinks 202 formed therein. These countersinks 202 are arranged such that an end 204 of bushings 156 may extend past the edge of the pilot ring associated with the particular bushing (in the case of FIG. 8, pilot ring 154) and freely move into the countersink without any obstruction or prevention of movement of the same. This ensures a sufficient enough compressive force may be applied using fasteners 158 and bushings 156 against disc pack 150. As may be seen in FIG. 8, there exists an axial clearance between an axially facing end of body portion 212 (see FIG. 9) of each bushing 156 and countersink 202 that the end of body portion 212 moves into as fastener 158 is tightened. It will be recognized that the identical configuration exists for those fasteners 158 which thread through flange 190 of end member 130, as depicted in FIGS. 6 and 7. Further, as stated above, an identical configuration exists for connection arrangement 136. It will also be noted that the use of such countersinks is only one of several examples, instead, a flat or counterbore may be machined into the opposed flanges to receive the ends of the bushings, as can be seen for example above in FIGS. 4 and 5.

Figure 9:
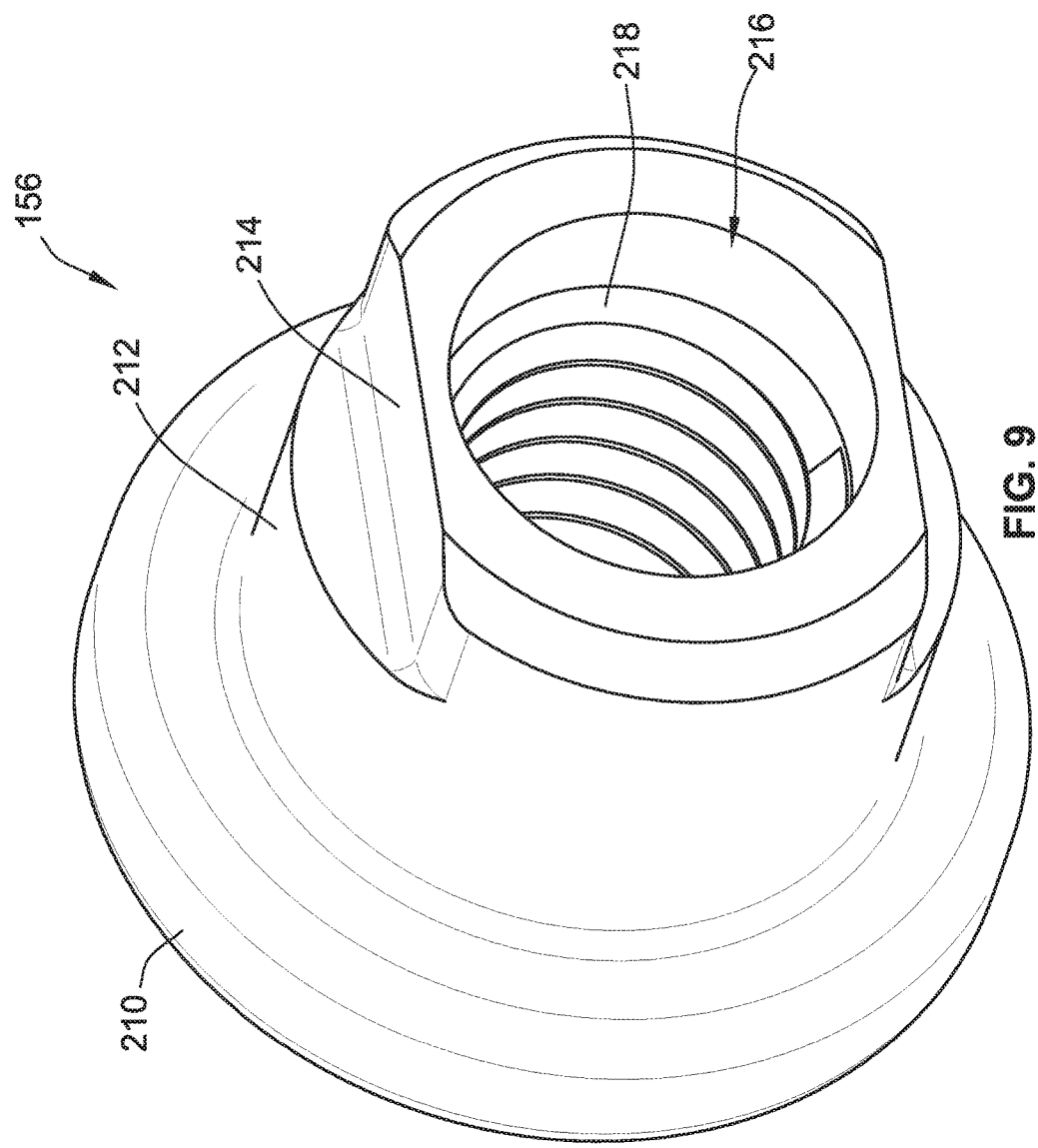
FIG. 9 is a perspective view of an exemplary embodiment of a bushing of the coupling assembly of FIG. 6.

Turning now to FIG. 9, each bushing 156 includes a head portion 210 having a flange (the head portion also referred to herein as a flange portion 210), and a body portion 212 extending from flange portion 210 terminating with a non-circular outer periphery is generally shown at 214. In the same manner as bushings 46, 56, described above, the non-circular outer periphery generally at 214 is non-circular in its shape and is received by a non-circular aperture in the pilot ring associated with the same. (see e.g. non-circular aperture 168 of pilot ring 154 shown in FIG. 11). A bore 216 extends through bushing 156 and includes threads 218 to accommodate threaded fasteners 158. These threads 218, as well as the threads of fasteners 158, may include a coating to increase lubricity. Non-limiting examples of such a coating may be black oxide or electroless nickel coatings.

Figure 10:
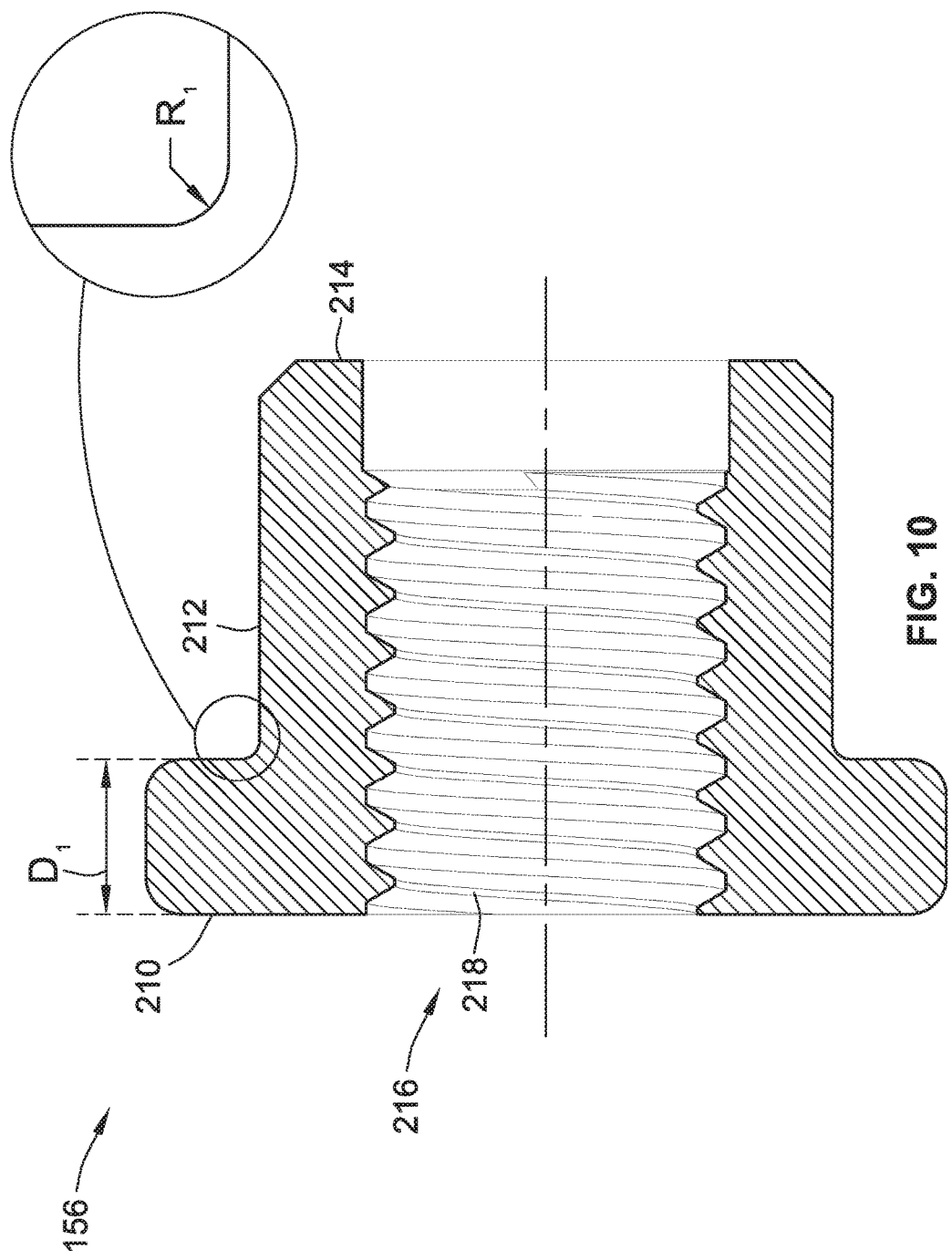
FIG. 10 is a cross section of the bushing of FIG. 9.

With reference to FIG. 10, bushings 146, 156 have several advantageous dimensional features which allow for the accommodation of the high compressive forces placed on the same. First, as can be seen from bushing 156 illustrated in FIG. 10, flange portion 210 has a sufficient thickness $D_1$ to handle the bending moment placed against the same. Indeed, referring momentarily back to FIG. 8, as fastener 158 is tightened, flange portion 210 is biased against disc pack 210 while the remainder of bushing 156 is under tension as it is drawn toward flange 176.

Without a sufficient thickness, flange portion 210 could bend causing the same to move toward the flange of body member 126 and potentially contact the same. Such an undesirable configuration would prevent further tightening of fastener 158, and the compressive force exerted thereby would be substantially reduced. As one example, this thickness $D_1$ may be about 0.050 inches to about 0.100 inches, more preferably about 0.070 inches to about 0.090 inches, and even more preferably about 0.083 inches to about 0.087 inches. The term "about" in this instance is intended to allow for typical manufacturing tolerances, e.g. plus or minus 0.005 inches. It will be recognized, however, that the thickness $D_1$ will ultimately be dictated by the expected loading conditions of bushing 156 in a given application.

Further, bushings 146, 156 also include a radius which securely locates the disc of the disc pack which is closest the flange portion of the bushing. Referring to bushing 156 of FIG. 10, this radius $R_1$ is shown between flange portion 210 and body portion 212. This radius $R_1$ creates an interference fit between the disc of disc pack 150 closest to flange portion 210. As one example, this radius $R_1$ may be about 0.005 inches to about 0.015 inches, and is preferably about 0.010 inches. The term "about" in this instance is intended to allow for typical manufacturing tolerances, e.g. plus or minus 0.005 inches. It will be recognized, however, that the radius $R_1$ will ultimately be dictated by the overall size of the bushing.

Figure 11:
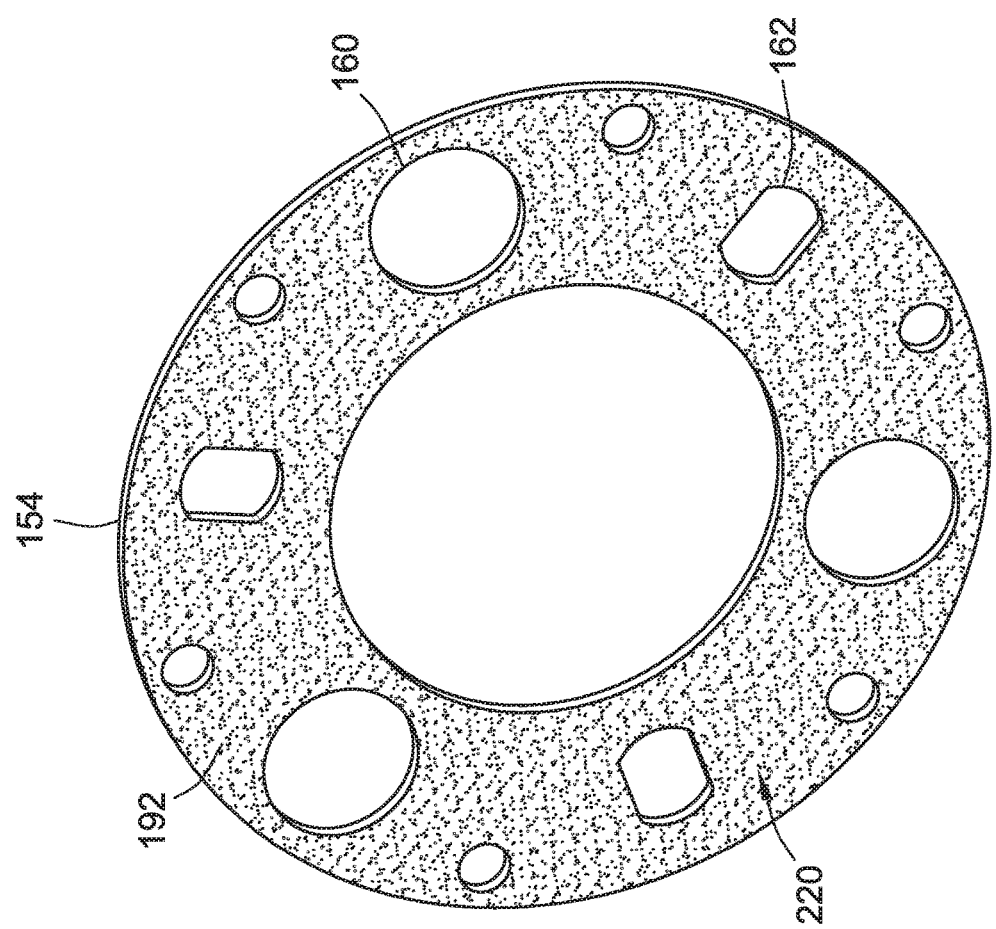
FIG. 11 is a perspective view of an exemplary embodiment of a pilot plate of the coupling assembly of FIG. 6.

Turning now to FIG. 11, as introduced above, coupling assembly 120 also includes an anti-slip arrangement formed between body member 126 and end member 128 as well as between body member 126 and end member 130. An embodiment of such an anti-slip arrangement includes surface coatings as described below which increase overall surface roughness between surfaces in contact with one another to reduce or eliminate relative rotational movement between body members 126 and end members 128, 130. The result of such a configuration allows for a higher torque transfer via friction between these components and also a more linear and predictable torsional stiffness curve. In prior designs which do not utilize the combination of features described herein, the torsional stiffness is considerably non-linear, and typically only thirty to forty percent of the torque is frictionally transferred through the coupling.

An example of such a surface coating is depicted on pilot ring 154 shown in FIG. 11. As can be seen in this view, the surface 192 which faces axially facing surface 194 of flange 176 (see FIG. 8) is coated with a coating 220 which increases the overall roughness of surface 192. Ideally, this coating has small particles which protrude from the coated surface 192 and are hard enough such that they embed into the opposed surface they are brought into contact with. Such a configuration advantageously reduces or eliminates the end members 128, 130 relative to body member 126 when a torque is applied to coupling assembly 120. This has the additional advantage of reducing or eliminating entirely the shear force applied to fasteners 148, 158 which would otherwise be applied by each connection arrangement 136, 138 in the event of such relative rotation. One example of such a coating may be a tungsten carbide based coating. As one particular example, Ultrabond® 5000 may be utilized as a base coat, with Eutectic® 29123 applied to the base coat which is a blend of atomized tungsten carbide/cobalt and nickel alloy powder.

Coating 220 may be applied to the outer surfaces 192, 196 of pilot rings 152, 154 as shown in FIG. 8. A like configuration is also utilized relative to pilot rings 142, 144 shown in FIG. 7. With the above coating configuration, it will be recognized that each pilot ring 144, 146, 152, 154 is effectively locked to its respective flange 176, 190, 230, 232 which it contacts. Indeed, coating 220 is considerably harder than the flange surface which it contacts, and as a result, the particles in coating 220 "bite" into the flange surface creating a superior frictional contact. As such, the aforementioned reduction or elimination of rotation of end members 128, 130 relative to body member 126 is reduced or eliminated entirely. It is also envisioned that coating 220 may be applied in the same manner to coupling assembly 20 described above.

Figure 12:
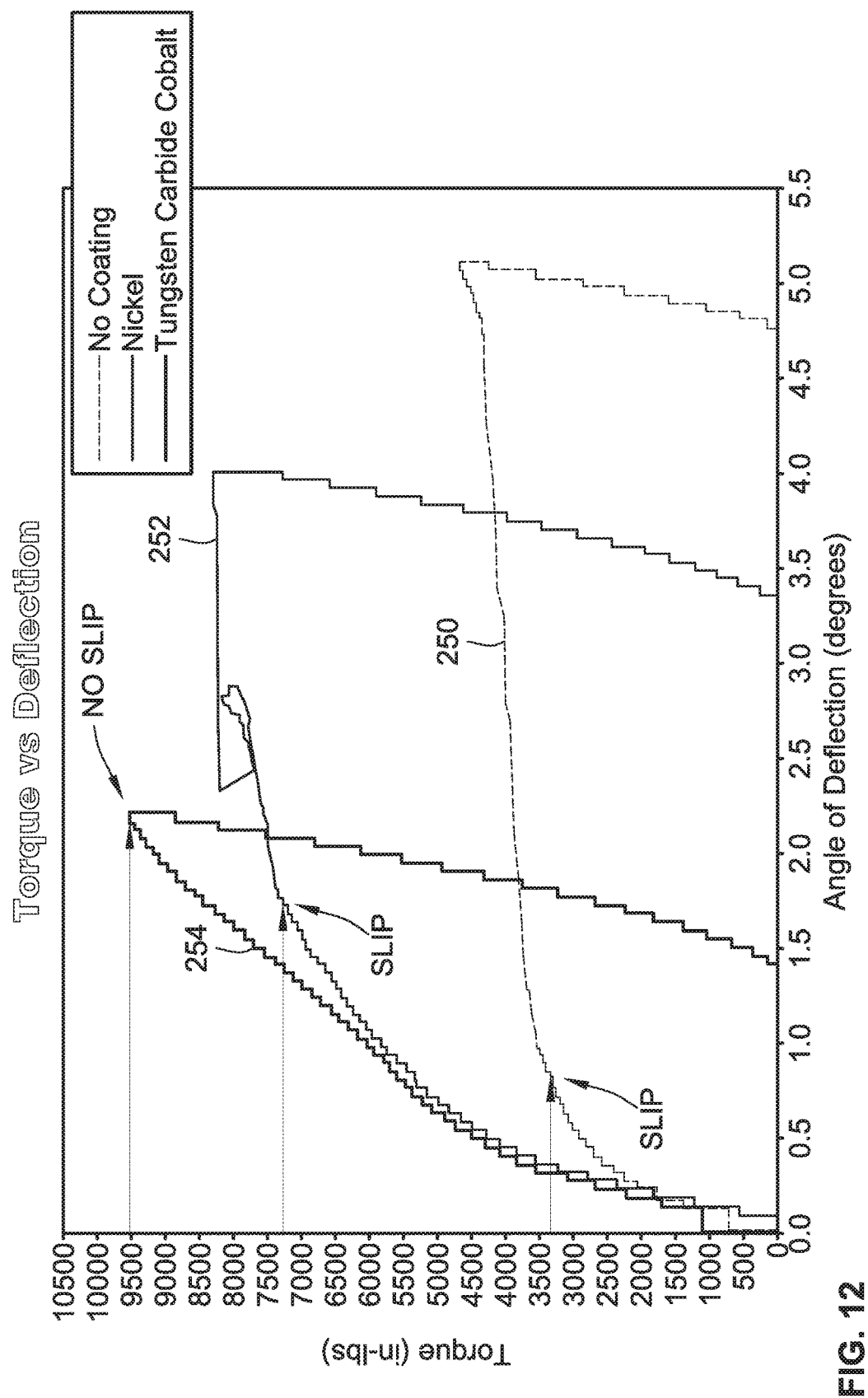
FIG. 12 is a graph illustrating comparative test results on the angle of deflection of the coupling assembly versus torque applied to the coupling assembly.

Turning now to FIG. 12, the same depicts test results measuring the angle of deflection of end member 128 relative to end member 130 within a plane normal to the longitudinal axis of coupling assembly 120 when a torque is applied to coupling assembly 120. As can be seen from the graph, three tests were conducted. The first test was relative to a coupling assembly 120 without any coating and its results are indicated at plot line 250. The second test was relative to a coupling assembly 120 having a nickel coating on its pilot rings and associated flanges in the same manner as described above and its results are indicated at plot line 252. Lastly, the third test was done using a coupling assembly 120 having coating 220 on its pilot rings and flange surfaces as described above and its results are indicated at plot line 254.

As can be seen from plot line 250, once a torque of approximately 3500 in-lbs was reached, a significant increase in the angle of deflection of end member 128 relative to end member 130 occurred, i.e. the uncoated coupling assembly 120 entered a slip condition. Such a slip condition is highly undesirable as it places the fasteners of coupling assembly in a shear stress state. As can be seen from plot line 252, once a torque of approximately 7250 in-lbs was reached, a significant increase in the angle of deflection of end member 128 relative to end member 130 occurred, i.e. the nickel coated coupling assembly 120 entered a slip condition. It will be recognized that, unlike the uncoated coupling assembly 120, this nickel coated coupling assembly 120 was able to accommodate a significantly higher torque before entering a slip condition. As can be seen from plot line 254, a torque of approximately 9500 in-lbs caused a failure of the coupling assembly 120 having coating 220 as described above without any slip. In other words, coupling assembly 120 with coating 220 advantageously accommodated a considerably larger input torque then a coupling assembly 120 without any coating, or a nickel coating. Further, this coated coupling assembly 120 did not exhibit slip. Instead, it predictably failed under a given maximum loading condition.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A coupling assembly, comprising:
   a body member, the body member including a radially protruding flange;
   at least one end member attached to the body member, the at least one end member having a radially protruding flange;
   at least one connection arrangement situated between the body member and the at least one end member, respectively, the at least one connection arrangement comprising a plurality of bushings, wherein the radially protruding flange of the body member includes an axially facing surface which faces the at least one connection arrangement, and wherein the at least one end member includes an axially facing surface which faces the at least one connection arrangement, the axially facing surface of the body member including a plurality of receiving features extending axially into the axially facing surface of the body member, the at least one end member including a plurality of receiving features extending axially into the axially facing surface of the at least one end member, wherein each receiving feature of the body member and of the at least one end member is configured to receive a body portion of a respective one of the plurality of bushings such that an axial clearance is formed between an end of said portion and said receiving feature;
   a plurality of fasteners respectively which are each respectively received by the plurality of bushings to fasten the body member to the at least one end member;
   an anti-slip arrangement interposed between the body member and the at least one end member; and
   wherein each one of the plurality of bushings are rotationally fixed about their center longitudinal axes by the at least one connection arrangement.

2. The coupling assembly of claim 1, wherein the at least one end member includes a first and a second end member and wherein the at least one connection arrangement includes a first connection arrangement and a second connection arrangement, the first connection arrangement interposed between the first end member and a first end of the body member, the second connection arrangement interposed between the second end member and a second end of the body member.

3. The coupling assembly of claim 2, wherein each of the first and second connection arrangements includes a disc pack interposed between a pair of pilot rings.

4. The coupling assembly of claim 3, wherein the disc pack includes a plurality of identical stacked flexible discs, wherein each one of the plurality of identical stacked flexible discs includes a hole pattern therein.

5. The coupling assembly of claim 3, wherein each one of the pair of pilot rings includes a plurality of circular apertures and a plurality of non-circular apertures formed therein.

6. The coupling assembly of claim 5, wherein the plurality of non-circular apertures of the pair of pilot rings respectively receive the body portions of the plurality of bushings, the body portion of each of the plurality of bushings having a non-circular outer periphery.

7. The coupling assembly of claim 6, wherein the body portion of each of the plurality of bushings is respectively received in the plurality of non-circular apertures to rotationally fix each bushing about its center longitudinal axis.

8. The coupling assembly of claim 1, wherein the body member includes a radially protruding flange and wherein the at least one end member includes a radially protruding flange, wherein the plurality of fasteners includes first set and second set, the first set and the second set opposed such that the first set seats against the body member flange and the second set seats against the at least one end member flange.

9. The coupling assembly of claim 8, wherein a terminal end of each of the plurality of fasteners is disposed, respectively, within an interior passageway of each of the plurality of bushings.

10. The coupling assembly of claim 1, wherein the anti-slip arrangement comprises a coating on axially outer facing surfaces of the at least one connection arrangement, the coated axially outer facing surfaces in surface contact with an axially facing surface of the at least one end member, and an axially facing surface of the body member.

11. The coupling assembly of claim 10, wherein the coated surfaces comprise tungsten carbide coating.

12. The coupling assembly of claim 1, wherein each one of the plurality of bushings includes a head portion having a flange, and a body portion extending from the head portion, the flange protruding radially outward relative to the body portion.

13. The coupling assembly of claim 12, wherein the flange portion has an axial thickness of about 0.070 inches to about 0.090 inches.

14. A coupling assembly, comprising:
a body member, the body member including a radially protruding flange;
at least one end member attached to the body member, the at least one end member having a radially protruding flange;
a connection arrangement situated between the body member and the at least one end member; the at least one connection arrangement comprising a plurality of bushings, wherein the radially protruding flange of the body member includes an axially facing surface which faces the at least one connection arrangement, and wherein the at least one end member includes an axially facing surface which faces the at least one connection arrangement, the axially facing surface of the body member including a plurality of receiving features extending axially into the axially facing surface of the body member, the at least one end member including a plurality of receiving features extending axially into the axially facing surface of the at least one end member, wherein each receiving feature of the body member and of the at least one end member is configured to receive a portion of a respective one of the plurality of bushings such that an axial clearance is formed between an end of said portion and said receiving feature;
a plurality of fasteners respectively received by the connection arrangement to fasten the body member to the at least one end member;
wherein the plurality of fasteners includes a first set and a second set, the first set and the second set are opposed such that the first set seats against the body member flange and the second set seats against the at least one end member flange; and
further comprising an anti-slip arrangement formed between the at least one end member and the body member, the anti-slip arrangement configured to reduce a rotation of the at least one end member relative to the body member about a longitudinal axis of the coupling assembly.

15. The coupling assembly of claim 14, wherein the at least one end member includes a first and a second end member and wherein the at least one connection arrangement includes a first connection arrangement and a second connection arrangement, the first connection arrangement interposed between the first end member and a first end of the body member, the second connection arrangement interposed between the second end member and a second end of the body member.

16. The coupling assembly of claim 15, wherein each of the first and second connection arrangements includes a disc pack interposed between a pair of pilot rings.

17. The coupling assembly of claim 16, wherein the disc pack includes a plurality of identical stacked flexible discs, wherein each one of the plurality of identical stacked flexible discs includes a hole pattern therein.

18. The coupling assembly of claim 16, wherein each one of the pair of pilot rings includes a plurality of circular apertures and a plurality of non-circular apertures formed therein.

19. The coupling assembly of claim 18, wherein the plurality of non-circular apertures of the pair of pilot rings respectively receive the body portions of the plurality of bushings of the connection arrangement, the body portion of each of the plurality of bushings having a non-circular outer periphery.

20. The coupling assembly of claim 19, wherein the body portion of each of the plurality of bushings is respectively received in the plurality of non-circular apertures to rotationally fix each bushing about its center longitudinal axis.

21. The coupling assembly of claim 20, wherein a terminal end of each of the plurality of fasteners is disposed, respectively, within an interior passageway of each of the plurality of bushings.

22. The coupling assembly of claim 19, wherein each one of the plurality of bushings includes a head portion having a flange, and a body portion extending from the head portion, the flange protruding radially outward relative to the body portion.

23. The coupling assembly of claim 22, wherein the flange portion has an axial thickness of about 0.070 inches to about 0.090 inches.

24. The coupling assembly of claim 14, wherein the anti-slip arrangement comprises a coating on axially outer facing surfaces of pilot rings of the at least one connection arrangement such that the coated axially outer facing surfaces of the at least one connection arrangement are in surface contact with an axially facing surface of the at least one end member, and an axially facing surface of the body member.

25. The coupling assembly of claim 24, wherein the coated surfaces comprise tungsten carbide coating.

* * * * *

UNITED STATES PATENT AND TRADEMARK OFFICE
CERTIFICATE OF CORRECTION

PATENT NO. : 10,495,152 B2
APPLICATION NO. : 15/221135
DATED : December 3, 2019
INVENTOR(S) : Ryan Kenneth Marks et al.

It is certified that error appears in the above-identified patent and that said Letters Patent is hereby corrected as shown below:

In the Claims

Column 13, Claim 10, Line 3 reads:
"facing surfaces of the at least one connection arrangement,"

Should read:
"facing surfaces of pilot rings of the at least one connection arrangement,"

Signed and Sealed this
Eleventh Day of February, 2020

Andrei Iancu
*Director of the United States Patent and Trademark Office*